(12) United States Patent
Cazzolato et al.

(10) Patent No.: US 12,454,902 B2
(45) Date of Patent: *Oct. 28, 2025

(54) EXHAUST GAS ASSEMBLY

(71) Applicant: The University of Adelaide, Adelaide (AU)

(72) Inventors: Benjamin Cazzolato, Forestville (AU); Carl Quentin Howard, Grange (AU); Orddom Leav, Hampstead Gardens (AU); Chris Turnbull, North Adelaide (AU)

(73) Assignee: The University of Adelaide, Adelaide (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/882,494

(22) Filed: Sep. 11, 2024

(65) Prior Publication Data

US 2025/0003359 A1 Jan. 2, 2025

Related U.S. Application Data

(63) Continuation of application No. 17/276,047, filed as application No. PCT/AU2019/000108 on Sep. 13, 2019, now Pat. No. 12,116,913.

(30) Foreign Application Priority Data

Sep. 13, 2018 (AU) .................................. 2018903441

(51) Int. Cl.
*F01N 1/08* (2006.01)
*F01N 1/10* (2006.01)
(Continued)

(52) U.S. Cl.
CPC .............. *F01N 1/08* (2013.01); *G10K 11/162* (2013.01)

(58) Field of Classification Search
CPC . F01N 1/08; F01N 1/082; F01N 1/085; F01N 1/10; F01N 1/16; F01N 1/21;
(Continued)

(56) References Cited

U.S. PATENT DOCUMENTS 2,934,889 A 5/1960 Poulos
2,936,846 A 5/1960 Tyler et al.
(Continued)

FOREIGN PATENT DOCUMENTS

DE 102007055401 A1 5/2009
DE 102013014455 A1 3/2015
(Continued)

*Primary Examiner* — Edgardo San Martin
(74) *Attorney, Agent, or Firm* — AVEK IP, LLC; Kent R. Erickson

(57) ABSTRACT

An exhaust duct assembly for conveying exhaust gases emanating from a combustion zone to atmosphere is disclosed. The assembly includes: an exhaust gas outlet for exhausting exhaust gas into the atmosphere; and an acoustic duct portion located upstream of the exhaust gas outlet, the acoustic duct portion having a peripheral wall defining a through-passage arranged and constructed to promote propagation of sound there-through. The acoustic duct portion has a length in a flow direction that is at least 50% of an average hydraulic diameter of the through-passage.

12 Claims, 10 Drawing Sheets

(51) Int. Cl.
*F01N 1/24* (2006.01)
*F01N 13/16* (2010.01)
*F02C 7/24* (2006.01)
*G10K 11/162* (2006.01)

(58) Field of Classification Search
CPC ........ F01N 13/08; F01N 13/082; F01N 13/16; F01N 13/20; F01N 2590/10; F01N 2260/16; F01N 2310/00; F01N 2310/04; F01N 2310/14; F01N 2340/00; F01N 2470/02; F01N 2470/04; F01N 2470/18; F01N 2470/20; F01N 2470/30; F01N 2510/04; F02C 7/24; F01D 25/30; F16L 55/0336; F16L 55/033; F16L 55/02; F05D 2260/96; G10K 11/162; G10K 11/161; G10K 11/16
See application file for complete search history.

(56) References Cited

U.S. PATENT DOCUMENTS

| | | | |
|---|---|---|---|
| 3,011,584 A | 12/1961 | Lemmerman et al. | |
| 3,685,614 A | 8/1972 | Coanda et al. | |
| 3,690,606 A | 9/1972 | Pall | |
| 3,715,009 A | 2/1973 | Smith et al. | |
| 3,794,137 A | 2/1974 | Teodorescu et al. | |
| 4,105,089 A | 8/1978 | Judd | |
| 4,113,048 A | 9/1978 | Teodorescu | |
| 4,244,441 A | 1/1981 | Tolman | |
| 5,471,020 A | 11/1995 | Kelsall et al. | |
| 5,837,890 A | 11/1998 | Long | |
| 5,962,821 A | 10/1999 | Iannetti | |
| 6,539,702 B2 | 4/2003 | Nishimura et al. | |
| 6,612,106 B2 | 9/2003 | Balzer | |
| 8,087,491 B2 | 1/2012 | Merchant et al. | |
| 8,166,752 B2 | 5/2012 | Garcia et al. | |
| 8,974,272 B2 * | 3/2015 | Mornan | F24F 7/025 454/23 |
| 9,897,111 B2 | 2/2018 | Mornan et al. | |
| 12,116,913 B2 * | 10/2024 | Cazzolato | F01N 1/08 |
| 2005/0166809 A1 | 8/2005 | Sixsmith | |
| 2009/0057056 A1 | 3/2009 | Baumgartner | |
| 2012/0292407 A1 | 11/2012 | Mornan et al. | |
| 2015/0139823 A1 | 5/2015 | Mornan et al. | |

FOREIGN PATENT DOCUMENTS

| | | |
|---|---|---|
| JP | S5517906 U | 2/1980 |
| JP | 2011513613 A | 4/2011 |
| JP | 2013217369 A | 10/2013 |
| WO | 9530393 A1 | 11/1995 |
| WO | 2008018821 A1 | 2/2008 |
| WO | 2009099399 A1 | 8/2009 |
| WO | 2016040431 A1 | 3/2016 |

\* cited by examiner

EXHAUST GAS ASSEMBLY

CROSS-REFERENCE TO RELATED APPLICATIONS

The present application is a continuation of U.S. patent application Ser. No. 17/276,047, filed Mar. 12, 2021, which is a national stage application of International Application No. PCT/AU2019/000108, filed Sep. 13, 2019, which claims priority from Australian Provisional Patent Application No. 2018903441 titled "AN EXHAUST GAS ASSEMBLY" and filed on Sep. 13, 2018, the contents of all of which are hereby incorporated by reference in their entirety.

TECHNICAL FIELD

The present disclosure relates to noise control. In particular, the present disclosure relates to the control of noise emanating from hot exhaust systems.

BACKGROUND

Exhaust systems that emit high temperature gases, especially exhaust systems for combustion engines, typically have silencers. Silencers generally do not provide strong noise reductions at low frequencies and in some applications low frequency noise can be problematic.

Conventional silencers only provide good noise attenuation when the wavelength of the sound is comparable with the thickness of the absorptive material in the silencer. For example, at low frequencies, such as the 31.5 Hz octave band, which has a lower frequency limit of 22 Hz, and the 63 Hz octave band, and with a speed of sound around 500 m/s in a hot exhaust gas, the acoustic wavelength can be as large as 23 m. For large exhaust systems, such as those used on gas-fired power plants, industrial silencers are used. These silencers are lined with sound absorptive material that is typically about 0.5 m thick (only about ¹⁄₄₅th of the wavelength), and hence do not provide good sound attenuation at low frequencies. This can result in loud 'rumbling' or other low frequency sound effects being perceived at distances remote from the power plant.

A further challenge with controlling noise emanating from hot exhaust systems is that high temperature gases have reduced viscosity, making sound absorption more difficult.

A still further challenge with controlling noise emanating from hot exhaust systems is that high temperature gases have increased flow rates which has a big impact on self-noise (sound generated by the flow of the high speed gas through the exhaust system).

In outside environments, which are subject to variable winds, sound pressure levels (SPLs) at low frequencies do not always reduce at 6 dB with a doubling in distance in a direction away from an exhaust gas noise source. This is especially so where wind interacts with exhaust gases. Certain atmospheric conditions can cause or contribute to sound refraction over long distances. As a result, a challenge arises in adequately controlling noise emitted from hot exhaust systems.

Examples of problematic noise control situations as described above include gas-fired power plants, especially single-cycle plants. This is because the higher exhaust temperatures in single-cycle plants (550-600° C. compared with 80-200° C. for combined-cycles) reduces the efficacy of traditional silencers. This presents a challenge for acoustic control.

Other examples of problematic noise control situations include internal combustion engine powered generators used for commercial power generation, and calciners used in cement production.

It is an object of the disclosure to address at least some of the problems described above or to at least provide a useful choice.

SUMMARY

According to a first aspect of the present disclosure, there is provided an exhaust duct assembly for conveying exhaust gases emanating from a combustion zone to atmosphere, the assembly including:

an exhaust gas outlet for exhausting exhaust gas into the atmosphere; and an acoustic duct portion located upstream of the exhaust gas outlet, the acoustic duct portion having a peripheral wall defining a through-passage arranged and constructed to promote propagation of sound therethrough.

In one form, the acoustic duct portion has a length in a flow direction that is at least 50% of an average hydraulic diameter of the through-passage.

In one form, the acoustic duct portion has a length in the flow direction that is at least 100% of the average hydraulic diameter of the through-passage.

In one form, the acoustic duct portion has a length in the flow direction that is at least 200% of the average hydraulic diameter of the through-passage.

In one form, the acoustic duct portion includes a perforated sheet.

In one form, the acoustic duct portion includes a steel mesh.

In one form, the acoustic duct portion of the steel mesh is a woven cloth.

In one form, the assembly includes an air aspirating portion.

In one form, the air aspirating portion includes the acoustic duct portion.

BRIEF DESCRIPTION OF DRAWINGS

Embodiments of the present disclosure will be discussed with reference to the accompanying drawings wherein.

DESCRIPTION OF EMBODIMENTS

Figure 1:
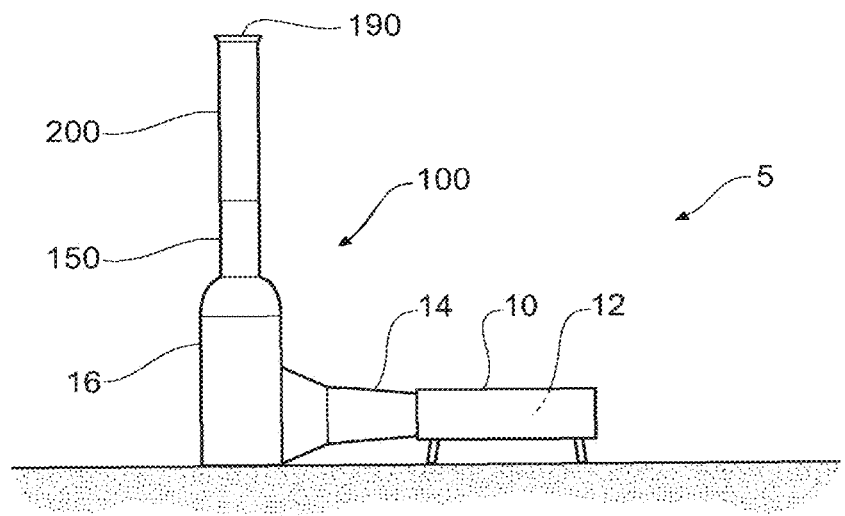
FIG. 1 is a diagrammatic elevational view of an exhaust duct assembly according to a first embodiment of the disclosure.

Referring now to FIG. 1, an exhaust duct assembly for conveying exhaust gases emanating from a combustion zone to atmosphere, according to a first embodiment of the disclosure, is shown diagrammatically in an elevational view. The assembly 100 includes an exhaust gas outlet 190 for exhausting exhaust gas into the atmosphere and an acoustic duct portion 200 located upstream of the exhaust gas outlet 190. The acoustic duct portion 200 has a peripheral wall 240 as can be seen more clearly in the diagrammatic cross-sectional view of FIG. 2A. The peripheral wall 240 defines a through-passage arranged and constructed to promote propagation of sound there-through.

Figure 2A:
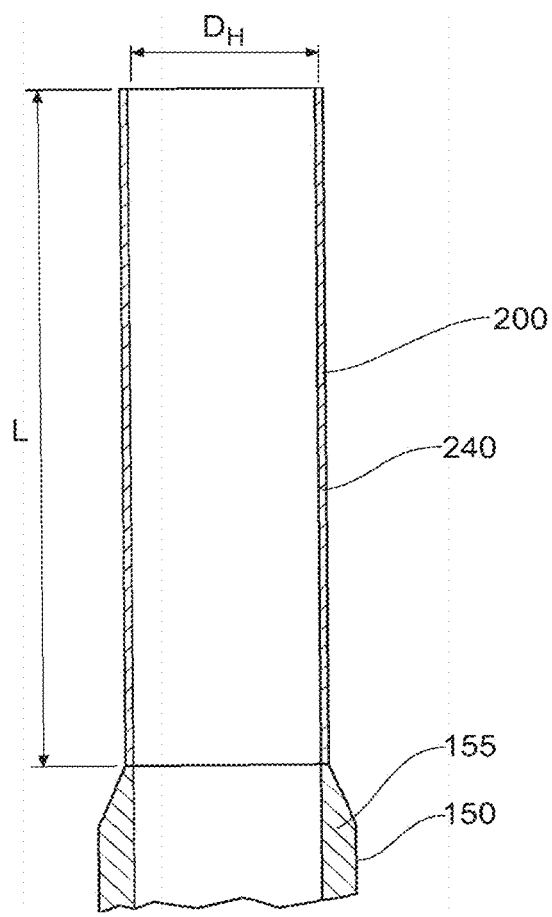
FIG. 2A is a diagrammatic cross-sectional view of an upper portion of the exhaust duct assembly shown in FIG. 1.

With the embodiment of the disclosure illustrated in FIGS. 1 and 2A, there is a plant utilising a gas turbine 10, to which the exhaust duct assembly 100 is connected, as diagrammatically shown in FIG. 1. Within the gas turbine 10 is a combustion zone 12. Exhaust diffuser ducting 14 links the turbine 10 to a silencer 16. High temperature exhaust gases flow from the combustion zone 12 through the exhaust gas diffuser 14 and then through the silencer 16 before entering the above described acoustic duct portion 200, in this case, linked by further intermediate ducting 150.

Figure 2B:
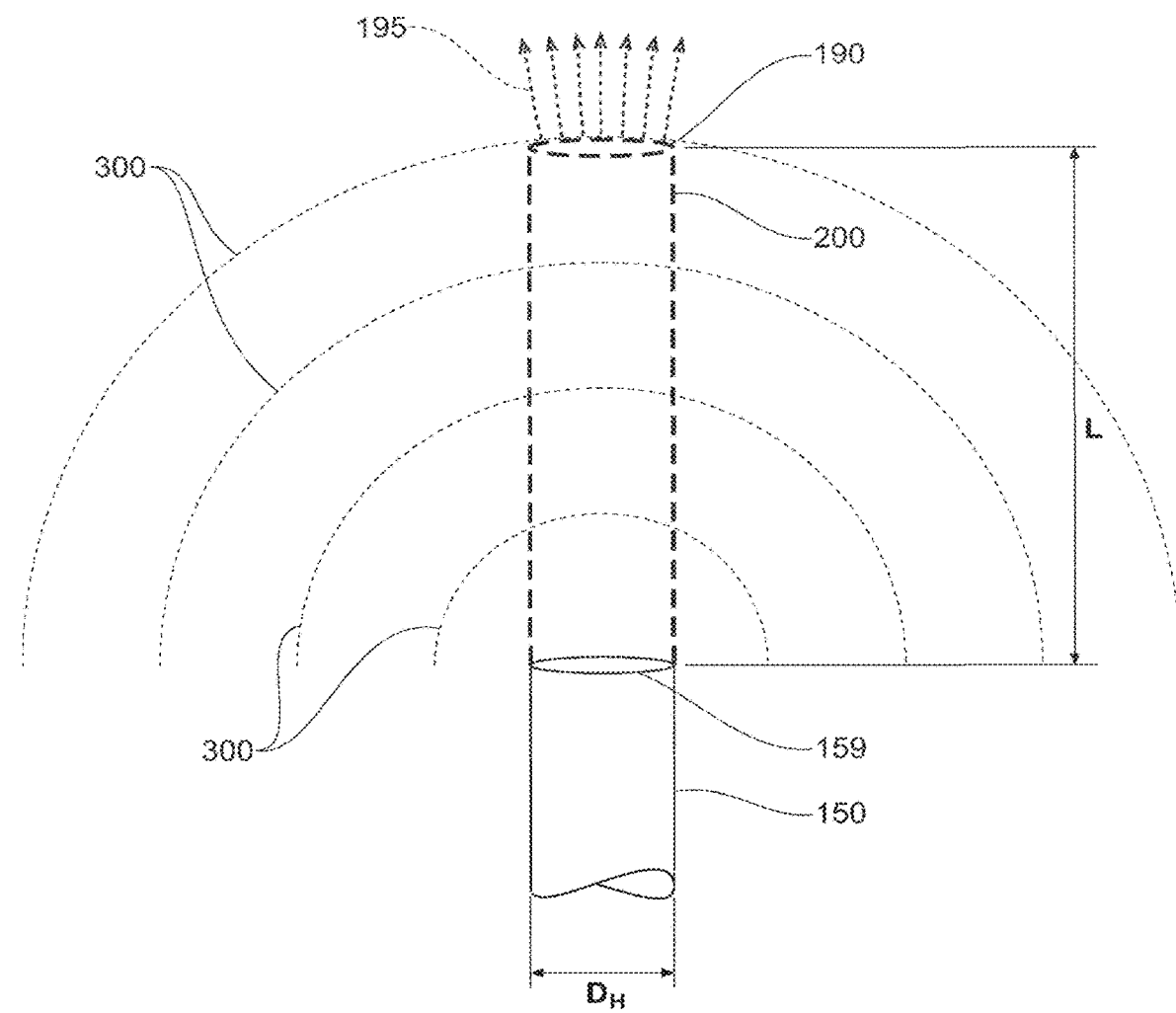
FIG. 2B is a diagrammatic view of a generalized upper portion of the exhaust duct assembly shown in FIG. 1.

Referring now to FIG. 2B, a generalized schematic drawing of an exhaust duct assembly shown in FIG. 2A is illustrated. Like the exhaust duct assembly of FIG. 2A, the exhaust duct assembly of FIG. 2B includes an exhaust gas outlet 190 for exhausting exhaust gas into the atmosphere and an acoustic duct portion 200 located upstream of the exhaust gas outlet 190. The acoustic duct portion 200 has a peripheral wall that defines a through-passage arranged and constructed to promote propagation of sound there-through. This is illustrated by the dashed semi-circular lines that illustrate hemi-spherical sound waves 300. The exhaust duct assembly shown in FIG. 2A could be fitted to any hot exhaust system.

In FIGS. 2A and 2B, the acoustic duct portion 240 has a length "L" in the flow direction. The internal diameter of the acoustic duct portion 200 is "$D_H$". Acoustic duct portions 200 where the ratio $L/D_H$ is higher will provide greater noise reduction benefits at locations remote from the plant, such as the downwind location 8 illustrated in FIG. 4, than acoustic duct portions 200 where the ratio $L/D_H$ is lower. While a range of $L/D_H$ may be used, with the embodiment illustrated, the acoustic duct portion has a length, L, in a flow direction, that is at 400% of average hydraulic diameter, $D_H$, of the through-passage. Or in other words, the ratio $L:D_H$ is approximately 4:1.

In FIG. 2B, sound waves 300 are shown. At length L, the sound waves 300 have a surface area of:

$$2\pi L^2$$

In the embodiment shown in FIG. 2B where $L=4 D_H$, this becomes:

$$2\pi(4D_H)^2 = 32\pi D_H^2$$

The inlet 159 to the acoustic duct portion 200 has a cross-sectional area $=\pi D_H^2/4$. The sound intensity ratio for the length L of acoustic duct portion 200, having a hydraulic diameter $D_H$ as compared to a hard duct that is not porous to sound is as follows:

$$[\pi D_H^2 4]/32\pi D_H^2 = 1/128$$

This is equivalent to a 21 dB reduction in sound intensity. The longer the porous acoustic duct portion 200, the greater the reduction in sound intensity at the outlet 190 of the acoustic duct portion 200, which reduces the amount of sound which can interact with the hot plume 195, thereby reducing sound refraction downstream (of any cross-flowing wind).

In FIG. 2A, the exhaust gas duct 150 is shown to include insulation 155. In practice, where the exhaust gas duct is used for a plant utilising a gas turbine, the diameter may be in the range of 3 to 7 metres for instance. The insulation may be about 1 metre in thickness and internal baffle silencers may be provided. These baffle silencers can be complimentary to the acoustic duct portion 200 and maybe useful in many applications.

With the embodiments described so far and shown in FIGS. 1 to 2B, the ducting has a circular cross-section. In such cases, measurement of the internal diameter, D is straightforward and will generally equal $D_H$, where $D_H$ is the hydraulic diameter of the duct. In other embodiments not shown, ducts having oval or rectangular cross-sections may be used. For such ducts, $D_H$ can be calculated and the same principal that acoustic duct portions 200 where the ratio $L/D_H$ is higher will provide greater noise reduction benefits will also apply.

Figure 4:
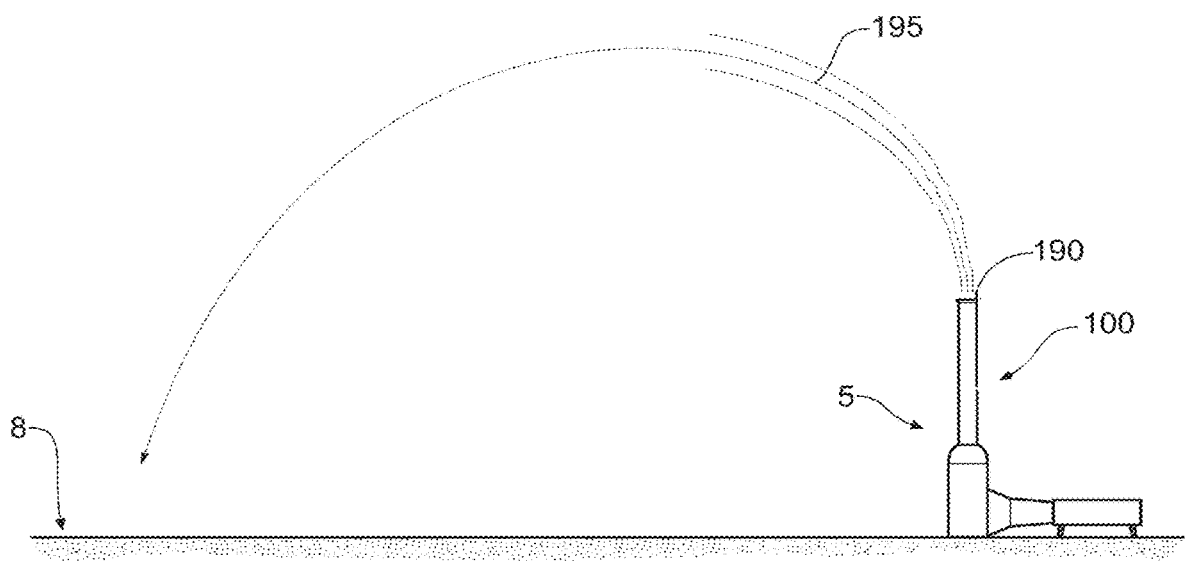
FIG. 4 is a diagrammatic cross-sectional view showing a locality in which an exhaust duct assembly is located and illustrating the effect of wind and sound propagation over distance.

The general arrangement illustrated in FIGS. 1 and 2A is also illustrated in FIG. 4 which is a diagrammatic cross-sectional view showing a locality in which an exhaust duct assembly 100 is located. FIG. 4 illustrates the effect of wind and sound propagation over distance. FIG. 4 illustrates a high temperature exhaust gas plume 195 being deflected by a crosswind. This will be described in more detail below. Returning to FIGS. 1 and 2A, and in particular FIG. 2A, it can be seen that the acoustic duct portion 200 is located between the exhaust gas duct 150 and the exhaust gas outlet 190. The acoustic duct portion 200 includes an acoustic duct wall 240 having a structural portion and a non-structural portion. The structural portion, which in this embodiment is a perforated metal duct, is arranged and constructed to hold the shape of the acoustic duct portion 200 against loads from gravity, wind, exhaust flow, thermal expansion and others. Generally, the structural portion is also arranged to cope with wind loads. The acoustic duct wall 240 also has a non-structural portion which is arranged and constructed to allow at least a range of low frequency sounds to pass there-through. While various materials can be used, in the embodiment of the disclosure illustrated, the non-structural portion is made from any acoustically non-reflective structure, including thin sheet, wire mesh, sheeting with perforated holes and/or woven cloth or glass/mineral fibre batts.

Figure 9:
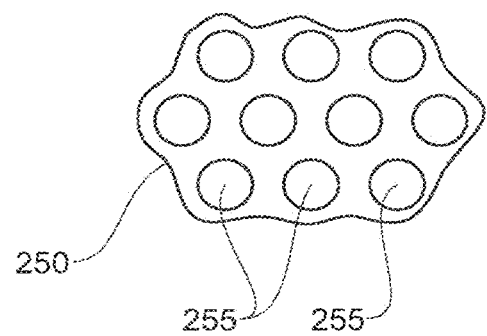
FIGS. 9 and 10 are detailed elevational and cross-sectional views respectively of a portion of the peripheral wall of the acoustic duct portion of the first embodiment of the disclosure.
Figure 10:
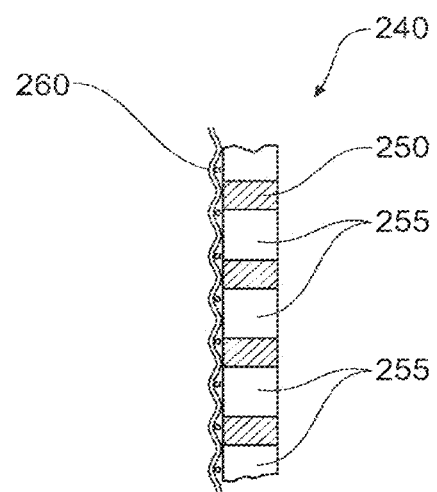

FIGS. 9 and 10 illustrate in more detail the structure of the acoustic duct wall 240. In particular, FIG. 9 shows a portion of the structural wall portion 250 which defines a plurality of apertures 255. FIG. 10 also shows the structural wall portion 250 and its apertures 255, but also shows the non-structural wall portion 260, in the form of wire mesh.

Figure 3:
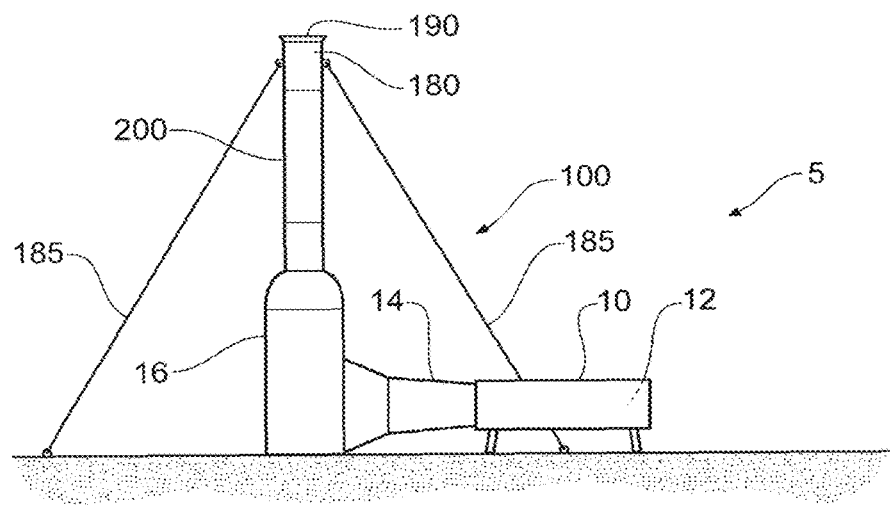
FIG. 3 is a diagrammatic elevational view of an exhaust duct assembly according to a second embodiment of the disclosure.

Turning now to FIG. 3, the exhaust duct assembly 100 shown in FIG. 3 is similar to that of the first embodiment of the disclosure shown in FIG. 1. However, with the second embodiment of the disclosure, a terminal duct portion 180 is provided after the acoustic duct portion 200. Attached to the terminal duct portion 180 are guy-wires 185 that are secured to the ground so as to provide additional lateral stability to the exhaust duct assembly 100.

Figure 5:
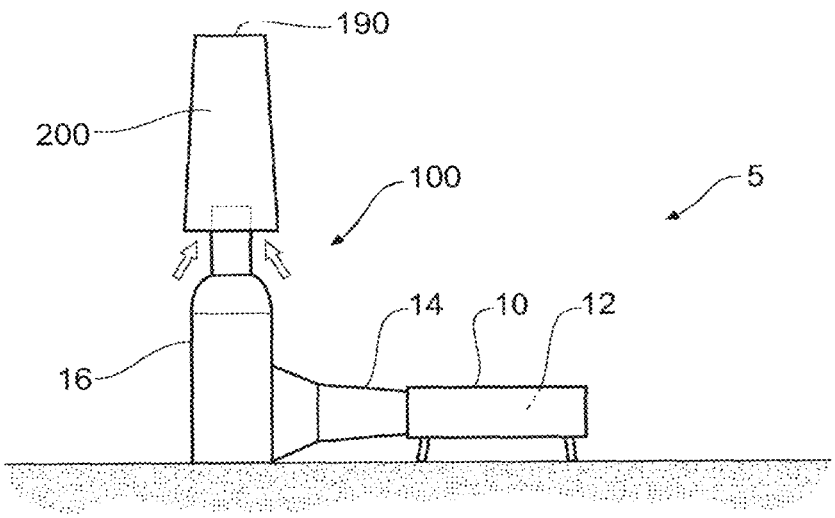
FIG. 5 is a diagrammatic elevational view of an exhaust duct assembly according to a third embodiment of the disclosure.

Now turning to FIG. 5, a third embodiment of the disclosure is shown. This embodiment includes an air aspirating portion. With this embodiment of the disclosure, the exhaust gas duct 150 terminates within a mouth 295 of the acoustic duct portion 200. The acoustic duct portion 200 is shaped to aspirate or entrain air into the exhaust gas plume as is indicated by arrows A. The entrainment of air into the exhaust gas plume lowers its temperature. This assists in reducing the tendency of the plume 195 to refract sound. The acoustic duct wall 240 shown in FIG. 6A can be constructed in the same way as was described above with reference to FIGS. 9 and 10. Alternatively, a different construction may be used.

Figure 6A:
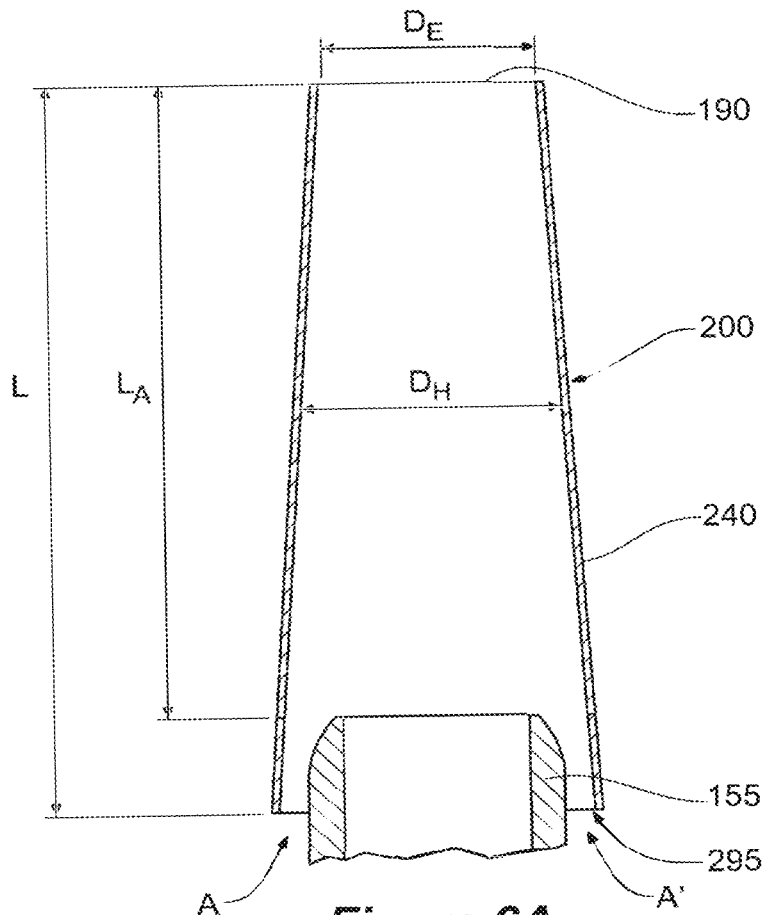
FIG. 6A is a diagrammatic cross-sectional view of an upper portion of the exhaust duct assembly shown in FIG. 5.
Figure 6B:
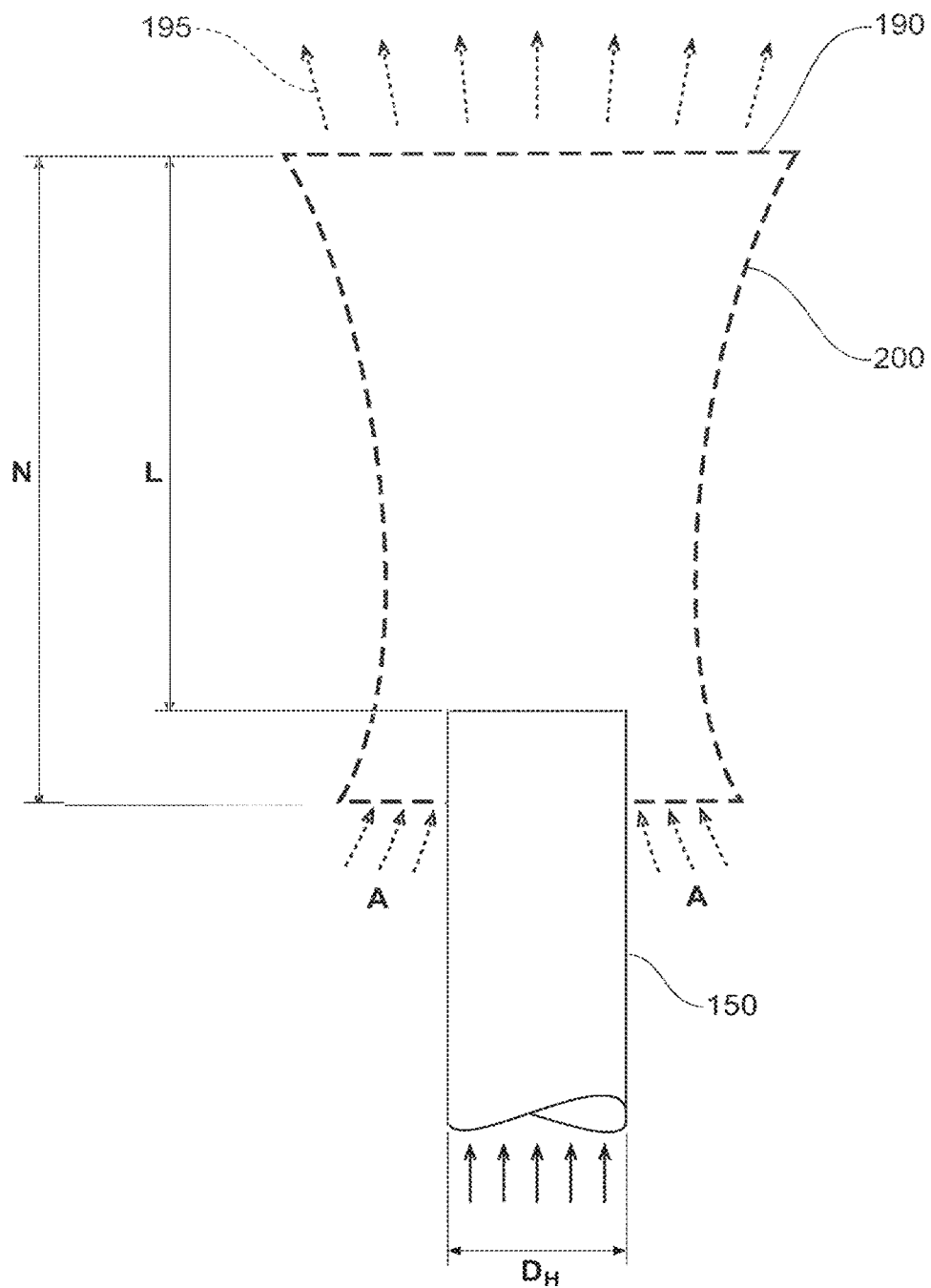
FIG. 6B is a schematic view of an upper portion of the exhaust duct assembly according a second generalized embodiment of the disclosure shown in FIG. 6A.

Referring now to FIG. 6B, a generalized schematic drawing of an exhaust duct assembly similar to that shown in FIG. 6A is illustrated. Like the exhaust duct assembly of FIG. 6A, the exhaust duct assembly of FIG. 6B includes an exhaust gas outlet 190 for exhausting exhaust gas into the atmosphere and an acoustic duct portion 200 located upstream of the exhaust gas outlet 190. Again, the acoustic duct portion 200 has a peripheral wall that defines a through-passage arranged and constructed to promote propagation of sound there-through. The shape of acoustic duct portion 200 and its positioning relative to the exhaust gas inlet 150 is such that ambient air is aspirated or entrained into the exhaust gas plume as is indicated by arrows A.

Both of the acoustic duct portions 200 shown in FIGS. 6A and 6B, have a length of "N" in the flow directions. The more relevant length for acoustic performance is "L", again measured in the flow direction. While a range of $L/D_H$ may be used, with the embodiment illustrated, the acoustic duct portion has a length, L, in a flow direction, that is at 400% of the average hydraulic diameter, $D_H$, of the through-passage. Or in other words, the ratio $L:D_H$ is approximately 4:1.

Figure 7:
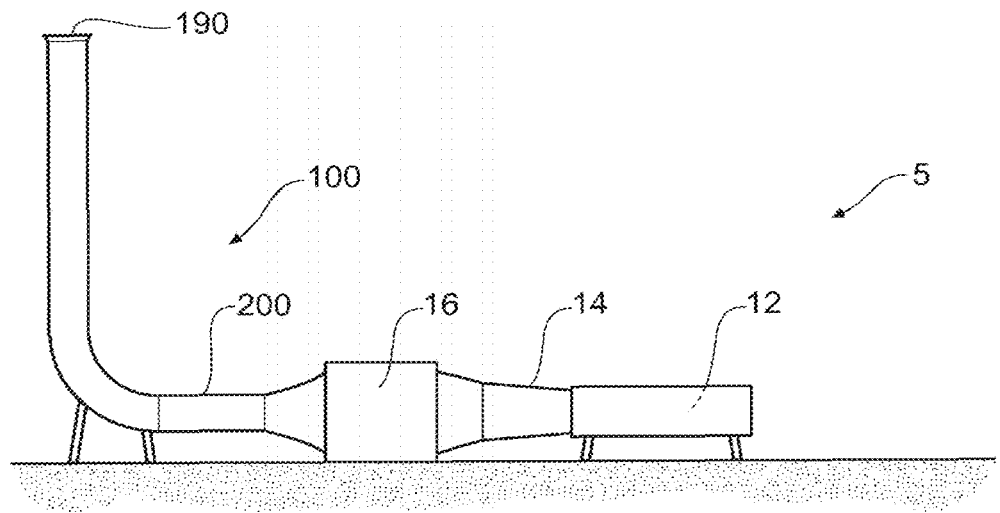
FIG. 7 is a diagrammatic elevational view of an exhaust duct assembly according to a fourth embodiment of the disclosure.

FIG. 7 shows a fourth embodiment of the disclosure. This fourth embodiment of the disclosure is similar to the first three embodiments of the disclosure, but where previously the acoustic duct portion 200 was orientated vertically at or towards the terminal end of the exhaust duct assembly 100, with this embodiment, the acoustic duct portion 200 is orientated horizontally. In other respects, this embodiment of the disclosure is similar. For instance, acoustic duct wall 240 may have the same construction as the acoustic duct portion 200 of the embodiments of the disclosure shown in FIGS. 1, 2, 3, 5, 9 and 10. On the other hand, with this arrangement, it may be less necessary to have a significant structural portion to the acoustic duct wall 240. The acoustic duct portion 200 may be placed and supported such that it is not subject to wind loads for instance.

In a variant of the embodiment illustrated in FIG. 7, the entire duct downstream of the silencer 16 may be acoustically porous (not just the duct portion 200 illustrated).

Figure 8:
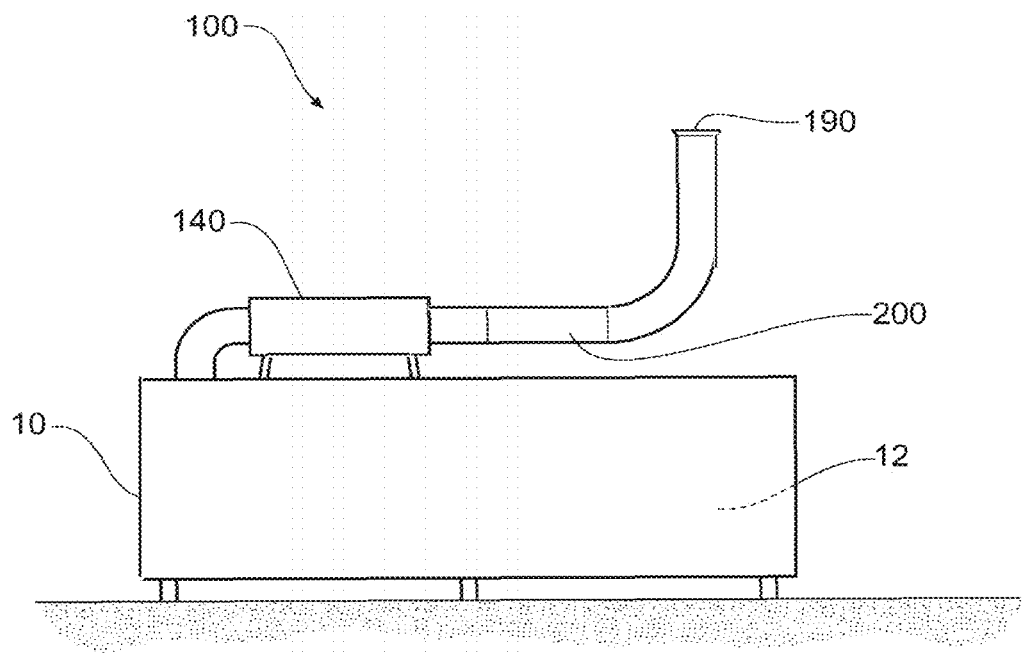
FIG. 8 is a diagrammatic elevational view of an exhaust duct assembly according to a fifth embodiment of the disclosure.

A fifth embodiment of the disclosure is shown in FIG. 8. With this embodiment of the disclosure, the acoustic duct portion is downstream of a combustion zone 12 within a generator set having an internal combustion engine.

Embodiments of the disclosure described above result in an exhaust stack that the internal wall is acoustically non-reflective (which implies the wall is either acoustically transparent or absorptive), meaning sound can readily pass into or through it, but still constrains the gas flow like, or at least somewhat like, a rigid-walled pipe. In doing so, the sound is separated from the exhaust plume and is able to radiate away from it, thereby being refracted (bent) less. Desirably, the acoustically porous exhaust duct portion will not change, or at least not substantially change, the flow characteristics or back pressure, which is important for dispersion of the gas and for turbine performance. Such embodiments can be constructed by using various materials with an appropriate flow resistance—sufficiently low so that sound can easily pass through it, but sufficiently high so that the gas flow continues along the exhaust duct until it reaches the outlet. Examples of such materials may include, but are not limited to: thin sheet, wire mesh, sheeting with perforated holes and/or woven cloth, or structures common in absorptive silencers comprising absorptive material (such as glass or mineral wool) sandwiched between structural elements such as perforated sheet. For instance, rockwool having a flow resistivity of 50,000 mks rayl/m, giving a flow resistance of ~5,000 mks rayls (Pa/m/s) may be suitable in some applications. More generally, rockwool or other suitable materials may be sized and arranged such that they provide a flow resistance in the range of 2,000 mks rayls (Pa/m/s) to 50,000 mks rayls (Pa/m/s).

An example of a specific application where embodiments of the disclosure can be used is in single-cycle gas-fired power plants where higher exhaust temperatures (550-600° C.) are generated. Exhaust plumes from such single-cycle gas-fired power plants produce high exhaust sound pressure levels that is strongly refracted (bent downwards) by the hot exhaust stream. When this is combined with a mild cross-wind, this results in increased sound pressure levels downstream at ground level, as illustrated in FIG. 11.

Figure 11:
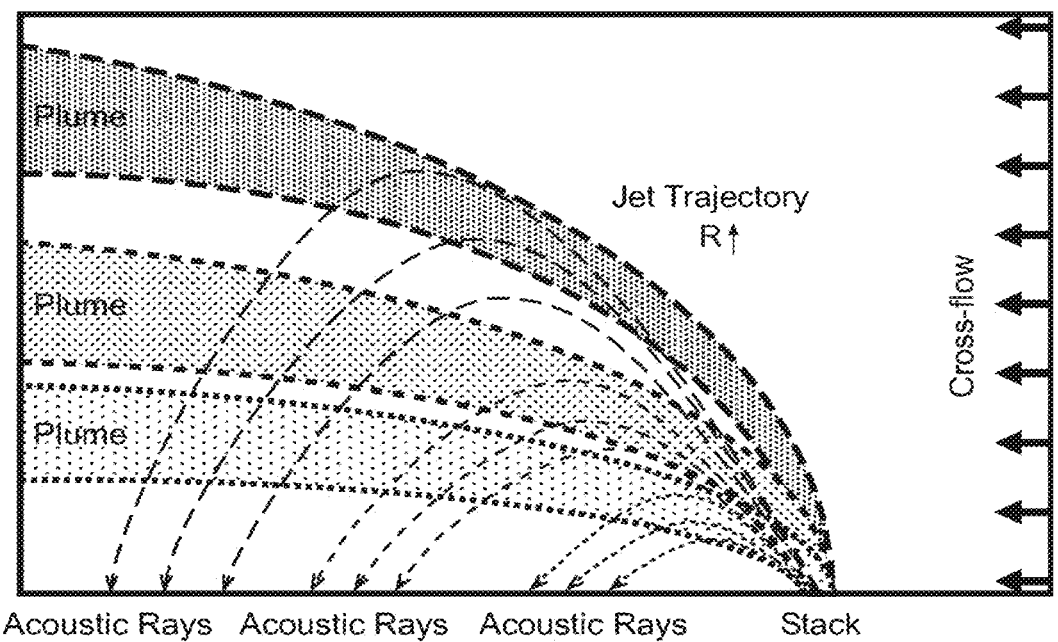
FIG. 11 illustrates the propagation of acoustic rays from a prior art exhaust system when exposed to a mild crosswind.

FIG. 11 shows that as ratio of the velocity of the exhaust compared with the velocity of the cross-flow, R, decreases, it causes the hot plume to be projected at higher angles, but the rays of sound are still refracted (bent) downwards to the ground. This can have a significant impact on neighbouring communities. This is diagrammatically illustrated in FIG. 4, where 190 is the exhaust gas outlet of plant 5 and 8 in a downwind locality remote from the plant 5. Sound is refracted within the plume 195 and is directed downwards towards locality 8. There are many documented cases where this has resulted in the SPL from plants exceeding noise ordinance regulations.

Figure 12:
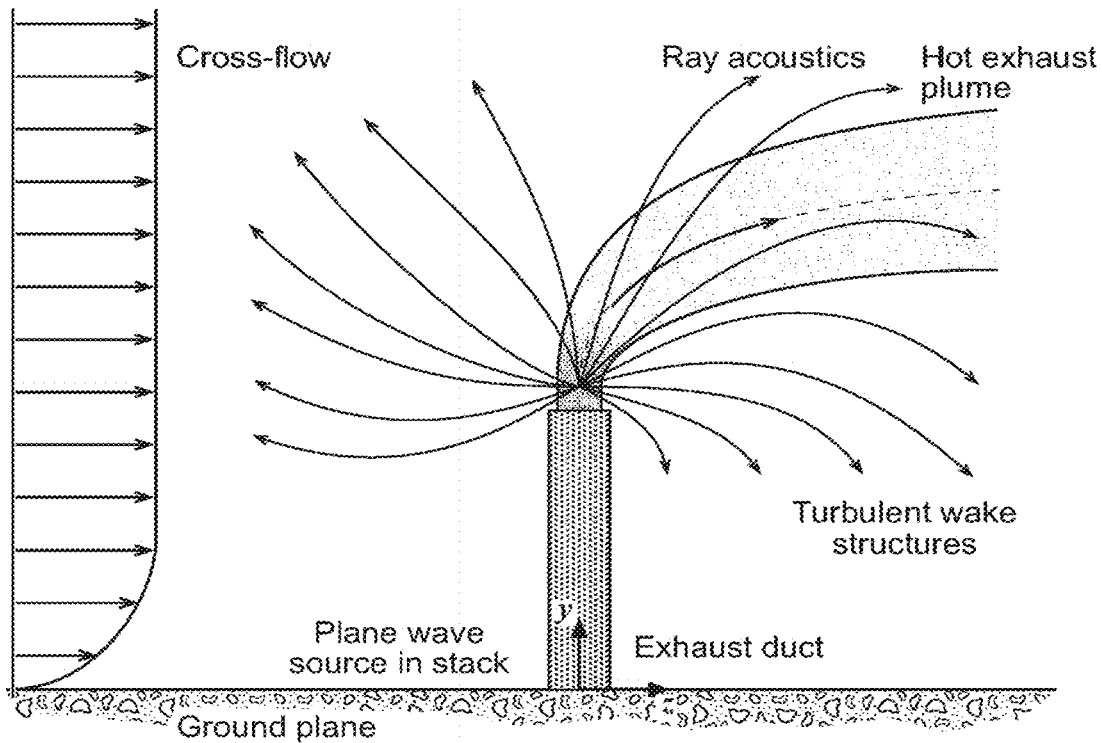
FIGS. 12 and 13 show schematically the acoustic interaction with a hot exhaust plume with and without (respectively) a flow impervious, acoustically-transparent nozzle.
Figure 13:
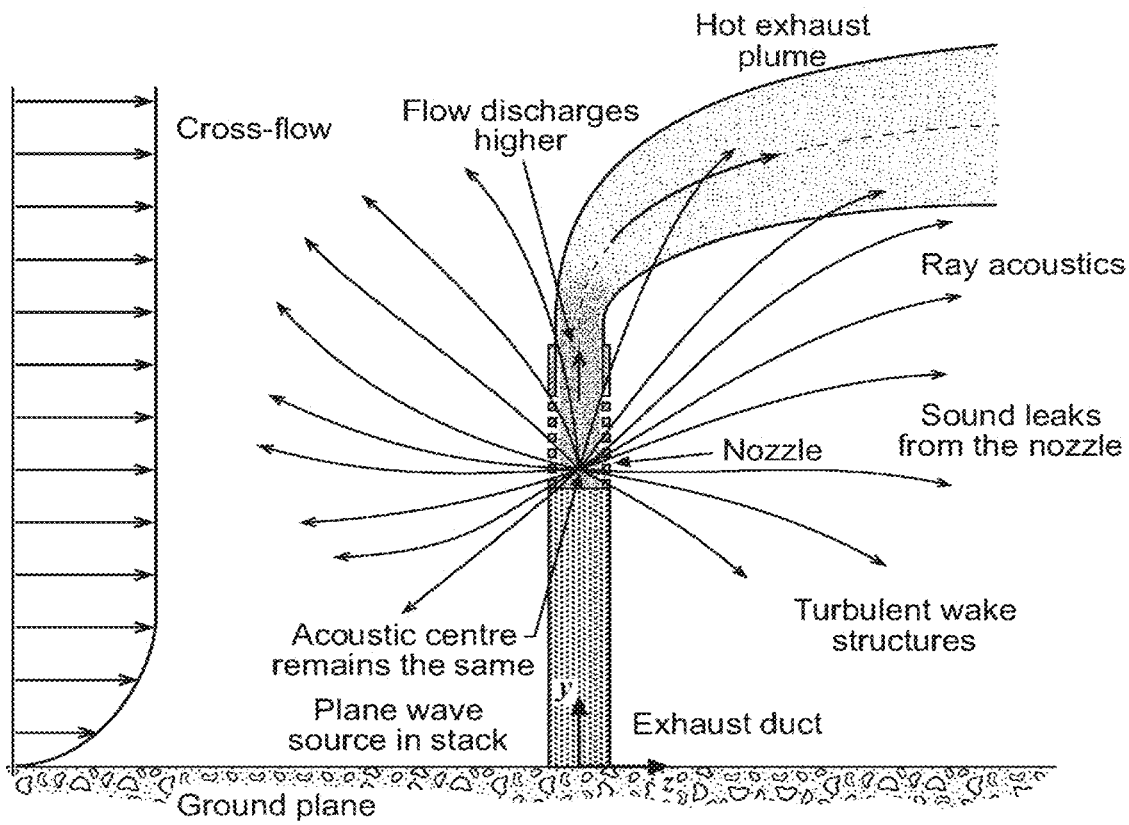

FIGS. 12 and 13 show schematically the acoustic interaction with the hot exhaust plume with (FIG. 12) and without (FIG. 13) a flow impervious, acoustically-transparent duct portion or nozzle (such as the acoustic duct portion 200 illustrated in FIGS. 1, 2A and 2B). The straight section nozzle 200 constrains the flow to the interior of the nozzle 200 and causes the fluid to exit the duct at a higher vertical height. The acoustically transparent nozzle or duct 200 allows for the acoustic centre of the duct to remain unaltered. This allows the acoustic energy (or at least a substantial proportion of the acoustic energy) to be 'released' or 'leaked' from the protruding vertical exhaust stack at an earlier stage. Hence, less sound interacts with the hot plume deflected by the cooler cross-winds. The reduction in sound interacting with the hot plume leads to a reduction in the amount of sound refracted by the plume and, ultimately, a reduction in the maximum SPL observed downwind of the exhaust stack.

As has been described above, embodiments of the disclosure control the way sound interacts with the hot exhaust plume, and ultimately reduces the amount of sound being refracted (bent) down towards the ground. The proposed disclosure does not unduly change the back-pressure, and hence does not change the gas-turbine performance, and maintains the original exit gas velocity so that gas dispersion characteristics are substantially unaltered.

Figure 14:
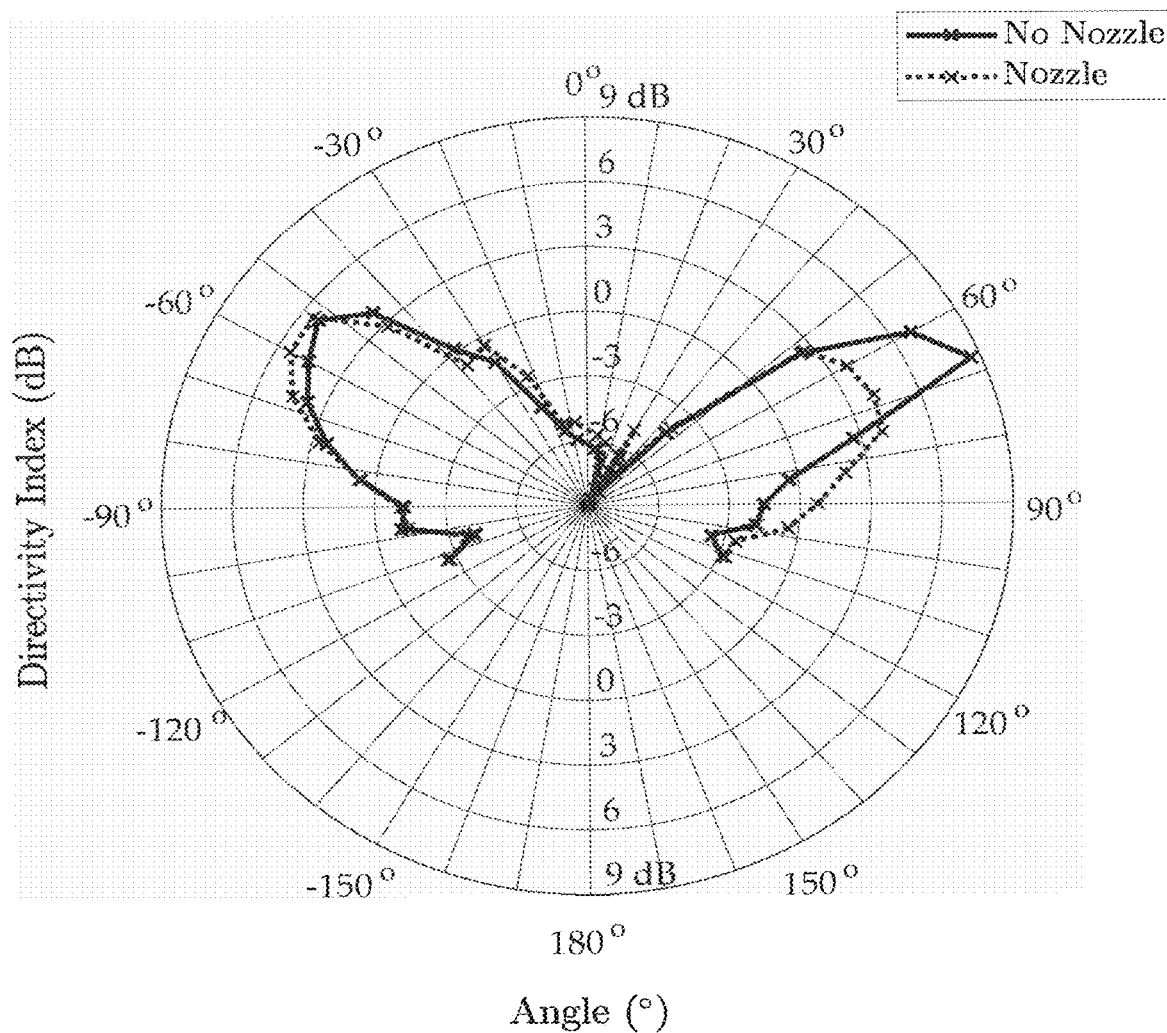
FIG. 14 is a sound directivity plot presenting test results from a small scale version of an acoustic duct portion according to the disclosure in a wind tunnel, with flow from left to right.

FIG. 14 is a sound directivity plot presenting test results from a small scale version of an acoustic duct portion according to the disclosure in a wind tunnel. The results shown are for the 5000 Hz one-third octave band which is equivalent to 50 Hz at a system scaled up 100 times (which would be a scale typical of a gas-fired power plant). The "Nozzle" plots are for a cross wind velocity of 3.38 m/s and an exhaust velocity of approximately 50 m/s. The acoustic duct (or "nozzle") reduces the peak levels on the right-hand side lobe by 3-6 dB. The measurements shown in FIG. 16 were taken at 28 diameters. This distance is equivalent to about 150 m from a stack at 100 times scale. Diffraction continues well beyond this distance.

This disclosure helps to address the problem of high noise levels in communities near plants producing hot exhaust streams, such as single-cycle gas fired power stations. Embodiments of the disclosure can be installed in existing or new plants. In many applications it is expected that traditional silencers will still be used, however, they will be smaller with much of the decrease in sound pressure levels downstream at ground level arising from embodiments of the acoustic duct portion described herein. More generally, this disclosure helps to address noise problems associated with many, if not all, hot exhaust systems.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

The invention claimed is:

1. A method of reducing refracted sound from a power station, the power station comprising a gas turbine and an exhaust duct assembly having an exhaust gas outlet for exhausting exhaust gas into the atmosphere, the method comprising:
    positioning an acoustic duct portion upstream of the exhaust gas outlet, the acoustic duct portion having a peripheral wall defining a through-passage arranged and constructed to promote propagation of sound therethrough to atmosphere, the peripheral wall including an acoustically porous structure, and wherein the acoustic duct portion has a length (L) in a flow direction that is at least 50% of an average hydraulic diameter (DH) of the through-passage; and
    operating the gas turbine,
    wherein noise from the exhaust gas propagates through the acoustically porous structure to atmosphere so as to reduce refracted sound at locations downwind from the exhaust gas outlet.

2. The method of claim 1, wherein the acoustic duct portion has a length (L) in the flow direction that is at least 100% of the average hydraulic diameter (DH) of the through-passage.

3. The method of claim 2, wherein the acoustic duct portion has a length (L) in the flow direction that is at least 200% of the average hydraulic diameter (DH) of the through-passage.

4. The method of claim 1, wherein the acoustic duct portion includes a perforated sheet.

5. The method of claim 4, wherein the acoustic duct portion includes a steel mesh.

6. The method of claim 5, wherein the acoustic duct portion of the steel mesh is a woven cloth.

7. The method of claim 1, including an air aspirating portion.

8. The method of claim 7, wherein the air aspirating portion includes the acoustic duct portion.

9. The method of claim 1, wherein the peripheral wall of the acoustic duct portion includes a structural portion and non-structural portion, the structural portion constructed to hold the shape of the acoustic duct portion, the non-structural portion of the acoustic duct portion arranged adjacent to the structural portion and constructed to allow at least a range of low frequency sound to pass there-through.

10. The method of claim 9, wherein the non-structural portion of the acoustic duct portion is made from an acoustically non-reflective structure.

11. The method of claim 10, wherein the structural portion includes a plurality of apertures extending there-through.

12. The method of claim 10, wherein the structural portion comprises a perforated sheet.

* * * * *